(12) United States Patent
Karl

(10) Patent No.: US 6,178,761 B1
(45) Date of Patent: Jan. 30, 2001

(54) AIR CONDITIONING CIRCUIT USING A REFRIGERANT FLUID IN THE SUPERCRITICAL STATE, IN PARTICULAR FOR A VEHICLE

(75) Inventor: Stefan Karl, Bazemont (FR)

(73) Assignee: Valeo Climatisation, La Verriere Cedex (FR)

( * ) Notice: Under 35 U.S.C. 154(b), the term of this patent shall be extended for 0 days.

(21) Appl. No.: 09/320,219

(22) Filed: May 26, 1999

(30) Foreign Application Priority Data

May 28, 1998 (FR) .................................................. 98 06738

(51) Int. Cl.[7] .................................................... F25B 29/00

(52) U.S. Cl. .............................. 62/159; 62/197; 62/196.4; 62/228.5; 62/513

(58) Field of Search .......................... 62/498, 115, 196.4, 62/113, 513, 159, 205, 206, 174, 502, 228.4, 228.5, 117, 197, 199, 200

(56) References Cited

U.S. PATENT DOCUMENTS

| | | | |
|---|---|---|---|
| 3,421,339 | * 1/1969 | Volk et al. | 62/159 |
| 5,245,836 | 9/1993 | Lorentzen et al. | 62/174 |
| 5,291,941 | 3/1994 | Enomoto et al. | 165/62 |
| 5,685,160 | * 11/1997 | Abersfelder et al. | 62/228.5 X |
| 5,694,784 | * 12/1997 | Frey et al. | 62/228.5 |

FOREIGN PATENT DOCUMENTS

| | | |
|---|---|---|
| 197 25 978 | 1/1998 | (DE) . |
| 93/06423 | 4/1993 | (WO) . |

* cited by examiner

*Primary Examiner*—Harry B. Tanner
(74) *Attorney, Agent, or Firm*—Morgan & Finnegan, LLP

(57) ABSTRACT

The $CO_2$ refrigerant fluid, compressed by the compressor to a supercritical pressure, is delivered through a three-way valve selectively into a cooler and/or into a bypass branch, so that in the former case, after passing through an expansion device, the fluid is vaporised in an evaporator so as to cool the cabin of the vehicle; while flow of the fluid through the bypass branch avoids the cooler so that the fluid is then cooled in the evaporator, thereby heating the cabin.

34 Claims, 4 Drawing Sheets

AIR CONDITIONING CIRCUIT USING A REFRIGERANT FLUID IN THE SUPERCRITICAL STATE, IN PARTICULAR FOR A VEHICLE

FIELD OF THE INVENTION

This invention relates to air conditioning apparatus. In particular, the invention is directed to air conditioning apparatus, especially for the cabin of a vehicle, in which the apparatus includes: an air conditioning loop for the flow of a refrigerant fluid therein, the loop containing a compressor which is arranged to receive the refrigerant fluid in the gaseous state and to compress it to a supercritical pressure; a first heat exchanger which is adapted to cool the fluid compressed by the compressor at a substantially constant pressure, by transferring heat from a first external medium to the fluid; a first expansion device which is adapted to reduce the pressure in the fluid leaving the first heat exchanger, so as to put at least some of the fluid in the liquid state; and an evaporator which is arranged to change the state of the fluid received from the first expansion device from the gaseous state to the liquid state at a substantially constant pressure, by taking heat from a second external medium for the purpose of cooling the space (for example the cabin of a vehicle) which is to be air conditioned. The fluid thus vaporised is then aspirated by the compressor.

BACKGROUND OF THE INVENTION

Forms of the apparatus of the above general type are described for example in the specifications of International Patent Publication No. WO93/06423, U.S. Pat. No. 5,245,836 and U.S. Pat. No. 5,291,941. The refrigerant fluid used in these apparatuses is typically carbon dioxide ($CO_2$).

Where it is not required to cool the air which is to be delivered into the cabin of a vehicle, but merely to heat the air, it is usual to utilize the heat which is produced by the propulsion engine of the vehicle, for example by passing air in contact with a heating radiator through which the engine coolant fluid flows. When the engine is cold, no heat can be drawn from it for the purpose of heating the cabin. This results in a considerable delay before the cabin can be brought to the required temperature, and is consequently detrimental to the comfort of the occupants of the vehicle. In some cases, the coolant liquid never, during the entire duration of a journey, reaches a high enough temperature to warm the occupants as they would wish.

In order to enable the cabin to be brought to the required temperature more quickly, various supplementary devices may be used, in particular those which involve the use of heaters or electrical radiators, but these are somewhat expensive.

DISCUSSION OF THE INVENTION

An object of the present invention is to enable a space, for example the cabin of a vehicle, to be heated more rapidly than hitherto when the engine is cold, or to increase the quantity of heat where the heat available is insufficient, without the need to provide of the any costly prior means for this purpose.

According to the invention, an air conditioning apparatus, especially for the cabin of a vehicle, includes for the flow of a refrigerant fluid therein, an air conditioning loop containing: a compressor adapted to receive the fluid in the gaseous state and to compress it to a supercritical pressure; a first heat exchanger arranged to cool the fluid compressed by the compressor at a substantially constant pressure, by transferring heat to a first external medium; a first expansion device adapted to reduce the pressure of the fluid leaving the first heat exchanger so as to put at least some of this fluid into the liquid state; and an evaporator to put into the gaseous state the fluid derived in the liquid state from the first expansion device, at a substantially constant pressure by taking heat from a second external medium for cooling the space to be air conditioned, with the fluid thus vaporised being subsequently aspirated by the compressor. The apparatus further includes a first bypass branch disposed in parallel with the first heat exchanger, switching means being provided for the purpose of causing the fluid to flow, as desired, in the first heat exchanger to constitute the air conditioning loop, or in the first bypass branch so as to constitute a heating loop in which the evaporator transfers heat from the refrigerant fluid to the second external medium for the purpose of heating the said space.

Preferably, the first expansion device serves to expand the fluid both in the air conditioning loop and in the heating loop. In other embodiments of the invention, the first expansion device serves to expand the fluid in the air conditioning loop, while the apparatus further includes a second expansion device which expands the fluid in the heating loop.

Where such a second expansion device is provided, it may be disposed at the output of the evaporator.

According to a preferred feature of the invention, a non-return valve is disposed between the output of the first heat exchanger and the upstream end of the first bypass branch.

According to another preferred feature of the invention, the air conditioning circuit further includes an internal heat exchanger which is adapted to transfer heat between two sections of the circuit which are common to both the air conditioning loop and the heating loop, the first said section situated between the downstream end of the first bypass branch and the first expansion device, the second said sections situated between the evaporator and the compressor.

The second expansion device may be disposed between the downstream end of the first bypass branch and the first section of the internal heat exchanger.

According to a further preferred feature of the invention, the apparatus further includes a second bypass branch which is arranged so as to be connected, by the said switching means, into the heating loop upstream of the evaporator, and this second bypass branch contains a second heat exchanger (not the internal heat exchanger mentioned above), which is also adapted to transfer heat from the refrigerant fluid to the second external medium for the purpose of heating the space.

Preferably then, the second bypass branch is arranged in parallel with the first expansion device, and contains the second expansion device upstream of the second heat exchanger.

The fluid flow switching means may include the first and second expansion devices, which prevent the flow of fluid to establish the heating loop and the air conditioning loop respectively.

The said second external medium is preferably a stream of air which is intended to be delivered into the space to be air conditioned. Preferably, the evaporator and the second heat exchanger are disposed in series in that order in the path of the flow of air.

A heat source external to the refrigerant fluid circuit is disposed in the path of the stream of air downstream of the evaporator, and if necessary downstream of the second heat exchanger.

Means may be provided for varying the thermal power transmitted from the heating loop to the second external medium. These means for varying thermal power are preferably adapted for the purpose of adjusting the first expansion device and/or the second expansion device. The means for varying the thermal power may constitute means for varying the capacity or the speed of the compressor.

In some embodiments of the invention, a reservoir is disposed in the air conditioning loop upstream of the compressor.

The various features and advantages of the invention will appear more clearly on a reading of the following detailed description of some preferred embodiments of the invention, which are given by way of non-limiting example only and with reference to the accompanying drawings, in which those elements which are identical or similar to each other are designated in all the Figures by the same reference numerals.

BRIEF DESCRIPTION OF THE DRAWINGS

FIGS. 1 to 4 show, respectively, a first, a second, a third and a fourth embodiment of the invention, by way of example.

DESCRIPTION OF PREFERRED EMBODIMENTS OF THE INVENTION

Figure 1:
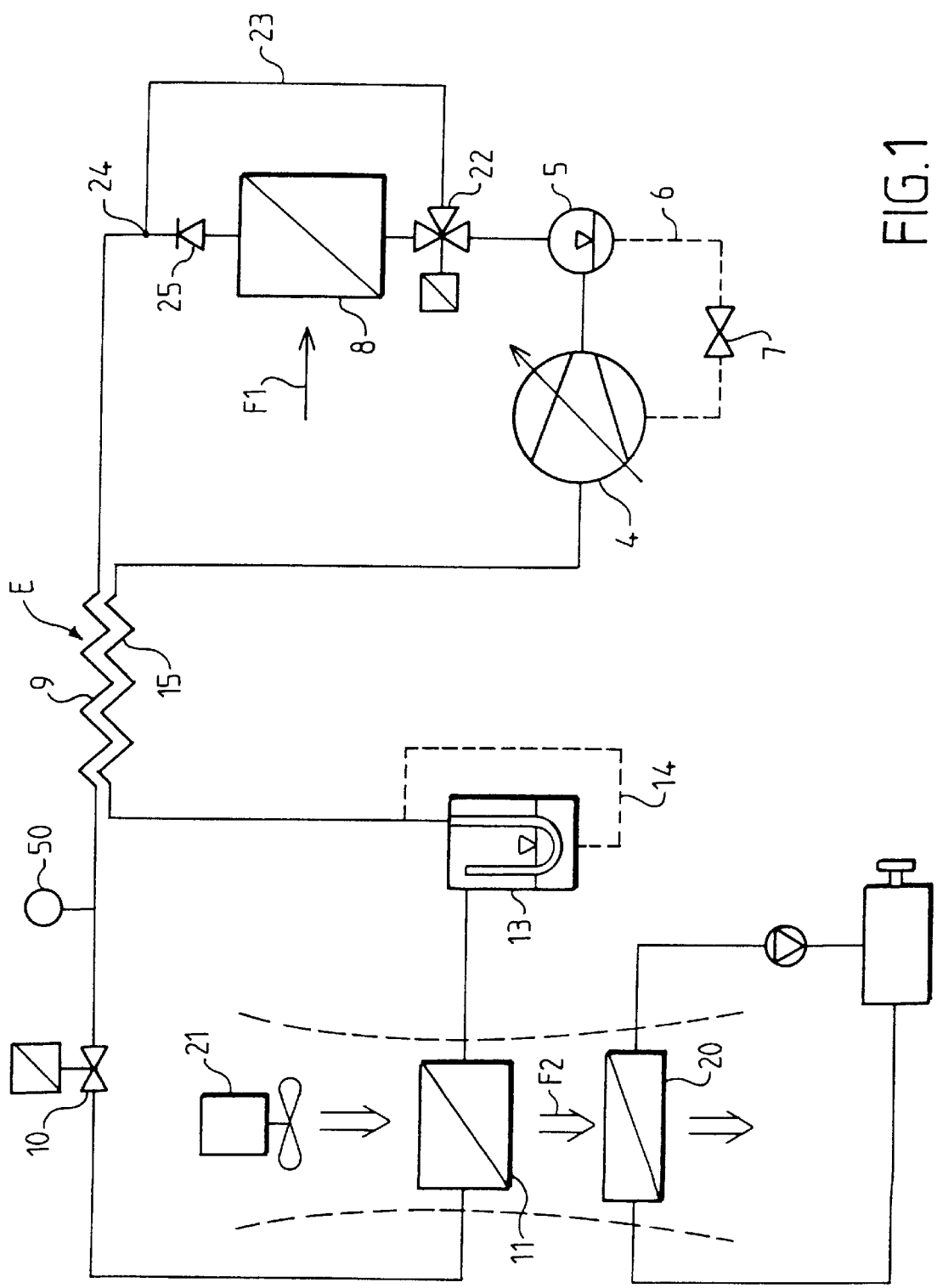
FIGS. 1 to 4 of the drawings are diagrammatic representations, simplified where appropriate, showing four different versions of an air conditioning apparatus for the cabin of a motor vehicle, in accordance with the invention.

In the present description, the expression "air conditioning apparatus" means an apparatus which enables the temperature in a space (such as the cabin of a vehicle) to be regulated, either by removing heat from that space or by putting heat into the space, according to the requirements of the user. Similarly, the expressions "air conditioning loop" and "heating loop" are used in this description to refer to loops of the air conditioning circuitry in which, respectively, the refrigerant fluid flows in order to cool the above mentioned space and to heat the space.

In each of the four versions shown in the drawings, the apparatus comprises a refrigerant fluid circuit which includes an air conditioning loop, together with at least one bypass branch which enables a heating loop to be formed. This circuit is arranged to enable the pressure of a refrigerant fluid, preferably carbon dioxide, to vary on either side of the critical pressure.

A brief description will first be given of the air conditioning loop, which is practically identical in the four versions shown in the drawings, and which is known. This loop comprises a compressor 4, which in the examples shown is of a variable output type, though it will of course be understood that the compressor need not be of a variable output type. The compressor 4 is followed in the loop by an oil separator 5, from which oil is delivered to the compressor through a feedback line 6 which includes an expansion device 7 for reducing fluid pressure. A heat exchanger 8 enables some of the heat produced by the refrigerant fluid during its compression in the compressor 4 to be transferred to a stream of air F1.

Connected to the heat exchanger 8, downstream of the latter, is one side 9 of an internal heat exchanger E. This is a simple two-element, or one-to-one, heat exchanger for supplementary cooling of the fluid, comprising heat exchanger elements 9 and 15 in heat transfer relationship. Connected in the circuit downstream of the heat exchanger element 9 is another expansion device 10, downstream of which an evaporator 11 is connected in the circuit. A further stream of air F2 is passed through the evaporator 11, after which this air is delivered into the cabin of the vehicle. From the outlet of the evaporator 11, the fluid is passed into a reservoir 13, which has a drain connected to the circuit downstream of the reservoir 13 through a bypass line 14.

The reservoir 13 prevents refrigerant fluid in the liquid state from being introduced into the compressor 4. In addition, the reservoir 13 provides a reserve of fluid which enables any variations in load, or fluid charge, in the refrigerant circuit, to be compensated for. The reservoir 13 has a main outlet for refrigerant fluid in the gaseous state, and this outlet is connected to the second heat exchanger element 15 of the internal heat exchanger E. The fluid flows in the heat exchanger element 15 in contraflow with respect to the flow in the element 9. From the heat exchanger element 15, the fluid returns to the compressor 4.

Again in a manner known, a heating radiator 20, which is in the conventional radiator in which coolant fluid from the engine of the vehicle is cooled, is arranged downstream of the evaporator 11 in the air stream F2. The stream of air F2 is produced by a conventional motorised fan unit 21.

A three-way valve 22 is disposed in the air conditioning loop, between the oil separator 5 and the heat exchanger 8. The three-way valve 24 is arranged to be controllable in such a way as to deliver the compressed refrigerant fluid into a bypass branch 23 which terminates at a junction point 24. The outlet of the heat exchanger 8 is connected to the junction point 24 through a non-return valve 25.

The circuit shown in FIG. 1 differs from a conventional $CO_2$ air conditioning circuit in particular by virtue of the presence of the three-way valve 22, the bypass branch 23 and the non-return valve 25. The three-way valve 22 can be controlled in such a way as to cause the fluid to flow either into the heat exchanger 8 and through the non-return valve 25, or else, alternatively, into the bypass branch 23, so that it does not pass through the heat exchanger 8. In this latter case, a heating loop is obtained in which the evaporator 11 serves as a source of heat for the stream of air F2.

Figure 2:
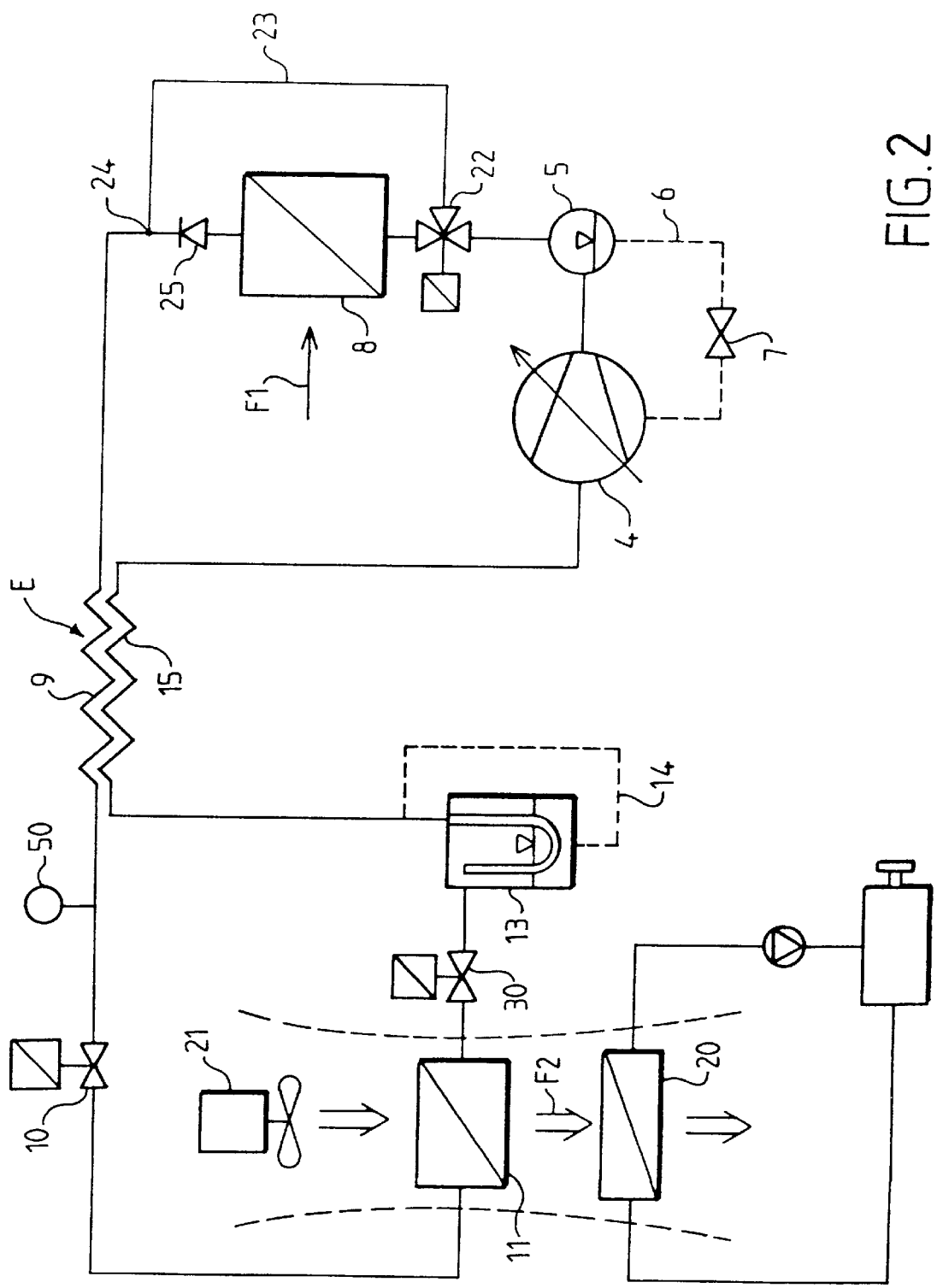

Reference is now made to FIG. 2 showing another embodiment, which differs from that shown in FIG. 1 by the addition of a second expansion device 30 between the evaporator 11 and the reservoir 13. In this connection, it can in some cases be of advantage to reduce the pressure in the heating loop after the refrigerant fluid has been cooled in the evaporator. In the circuit shown in FIG. 1, this expansion took place upstream of the evaporator, in the heating loop in the same way as in the air conditioning loop.

Figure 3:
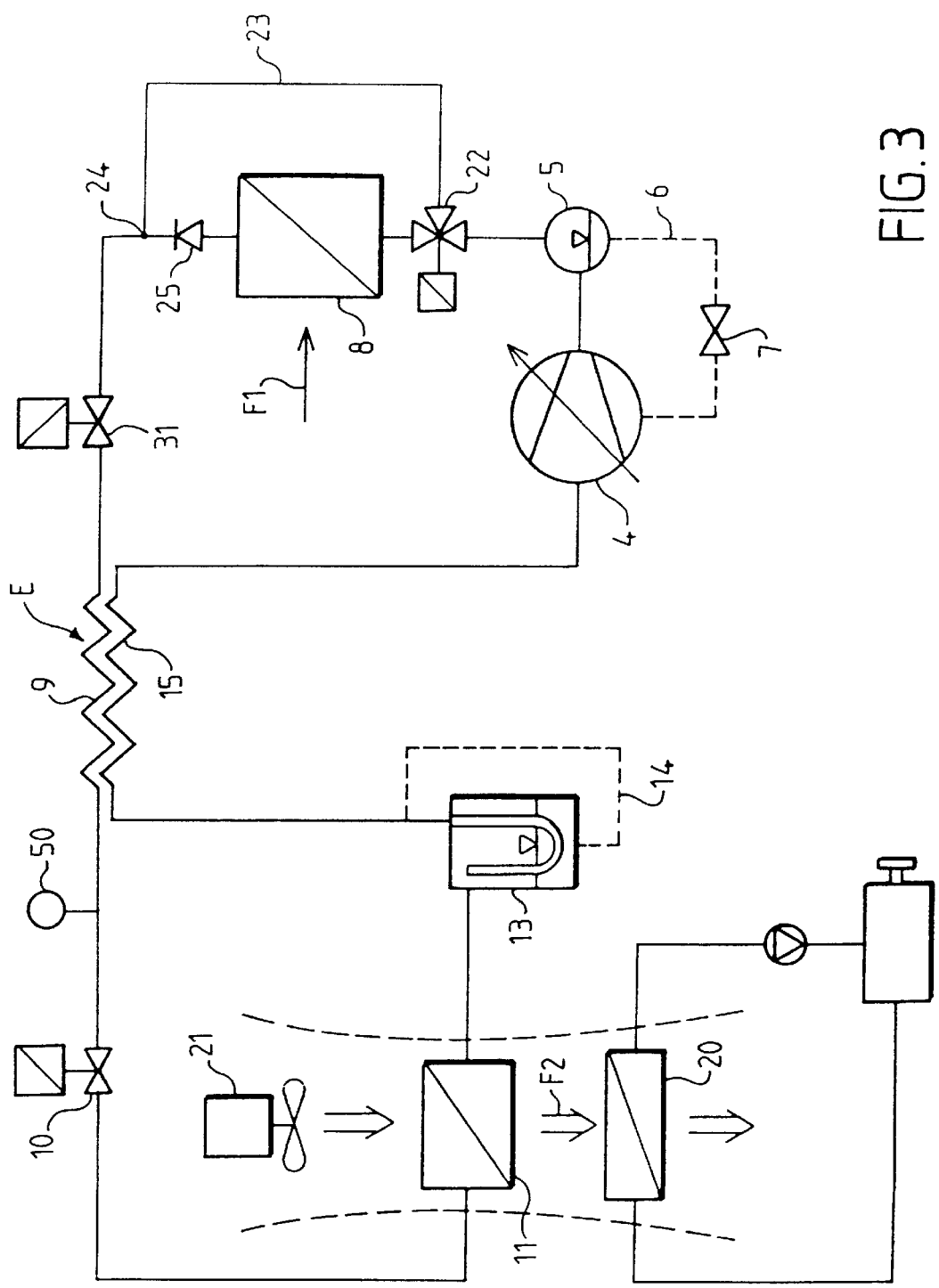

FIG. 3 shows a further version of air conditioning air circuit according to the invention, which differs from that in FIG. 2 in regard to the position of the expansion device in the heating loop. In FIG. 3, this expansion device, 31, is disposed between the junction point 24 and the primary element 9 of the internal heat exchanger E.

Figure 4:
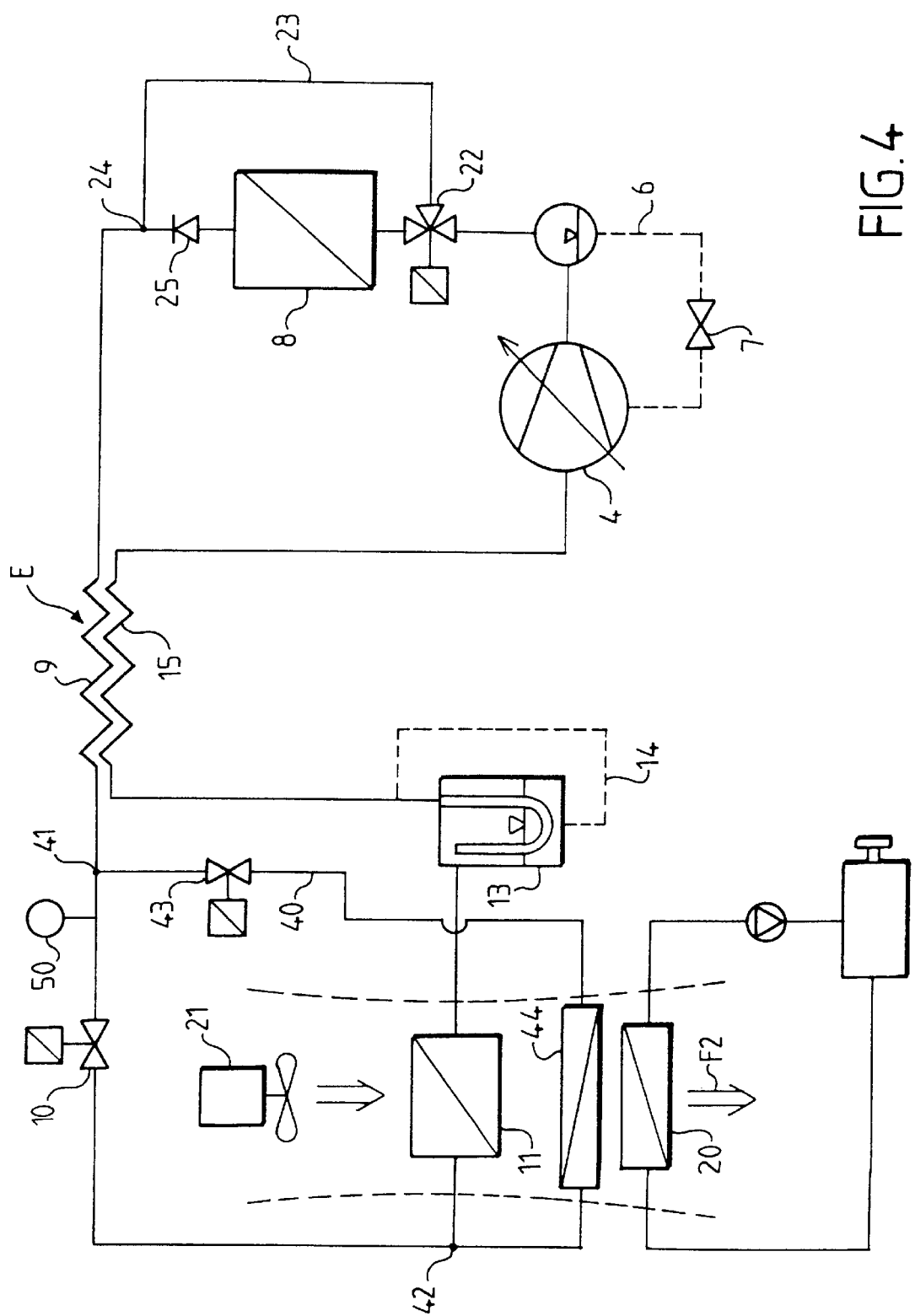

The final example to be described is that shown in FIG. 4, which illustrates the addition of a second bypass branch 40. The branch 40 starts at a junction point 41 in the circuit, located between the primary heat exchange element 9 of the internal heat exchanger E and the air conditioning expansion device 10. The loop 40 terminates at a junction point 42 between the device 10 and the input side of the evaporator 11. The bypass branch 40 contains a second expansion device 43, downstream of which, in the branch, is a further heat exchanger 44 which is arranged in the stream of air F2 between the evaporator 11 and the engine radiator 20.

The expansion devices 10 and 43 also serve as stop valves, and can be controlled, in conjunction with the three-way valve 22, in such a way as to cause the refrigerant fluid to flow either in the expansion device 10 at the same time as in the heat exchanger 8, or else in the bypass branch 40 at the same time as in the bypass branch 23. In this latter case, the transfer of heat from the refrigerant fluid to the stream of air F2 takes place mainly in the heat exchanger 44 and occurs, in such a way that the volumetric flow of the fluid in the evaporator 11 is reduced. This reduces noise resulting from flow of the fluid, while keeping the evaporator optimised for the air conditioning function. The stop function which is performed by the expansion devices 10 and 13 can of course be obtained in other ways: for example, a three-way valve may be disposed at the junction point 41 or the junction point 42. In yet another version, two-way valves may be inserted in the branches concerned.

In all the various embodiments of the air conditioning circuit according to the invention, a pressure sensor 50 is disposed between the primary side 9 of the internal heat exchanger E and the expansion device 10. Where appropriate, the sensor 50 may be downstream of the junction point 41. The power in the air conditioning loop can be controlled by using this sensor. The sensor may also be used in the versions of the apparatus shown in FIGS. 1 to 3, for controlling the power in the heating loop.

Control of the air conditioning loop may be carried out in a known way by acting on the capacity or speed of the compressor 4 or by acting on the expansion device 10. In an apparatus according to the invention, control of the heating loop may be carried out by acting on the output or the speed of the compressor, or on by acting the heating expansion device 10, 30, 31 or 43.

What is claimed is:

1. Air conditioning apparatus for treating the atmosphere in a space in a vehicle, the apparatus comprising
    a fluid flow circuit for flow of a refrigerant fluid therein from upstream to downstream, said fluid flow circuit including:
        a compressor adapted to receive said fluid in a gaseous state and compress said fluid to a supercritical pressure, the compressor having an upstream end and a downstream end;
        a first heat exchanger downstream of the compressor for receiving said fluid compressed by the compressor and cooling said fluid at substantially constant pressure by transfer of heat from said fluid to a first external medium, said first heat exchanger having an inlet and an outlet for said fluid;
        a first expansion device for receiving said fluid from said first heat exchanger and for reducing the pressure in said fluid so as to liquefy at least part of said fluid; and
        an evaporator downstream of the first expansion device, for receiving said fluid in the liquid state from the first expansion device and putting said liquid into the gaseous state at substantially constant pressure by taking heat from a second external medium to cool said space, the evaporator having an inlet side and an outlet side;
    means connecting the outlet side of the evaporator with the upstream end of the compressor whereby fluid vaporised in the evaporator is received by the compressor, a first bypass branch having an upstream end and a downstream end, the first bypass branch being connected in parallel with the first heat exchanger,
    fluid flow switching means connected with the inlet of said first heat exchanger and the upstream end of the first bypass branch, for selectively directing said fluid into the first heat exchanger to constitute an air conditioning loop, and into the first bypass branch to constitute a heating loop, whereby in said heating loop the evaporator can transfer heat from said fluid to said second external medium, to heat said spaces
    a second bypass branch connected with said fluid flow switching means, for connection by operation of said fluid flow switching means into the heating loop upstream of the evaporator, and
    a second heat exchanger in said second bypass branch, for transferring heat from said fluid to said second external medium for heating said space.

2. Apparatus according to claim 1, wherein the first expansion device is connected so as to expand said fluid in both the air conditioning loop and the heating loop.

3. Apparatus according to claim 1, wherein the first expansion device is connected so as to expand said fluid in the air conditioning loop, the apparatus further including a second expansion device in the heating loop, for expanding said fluid in the heating loop.

4. Apparatus according to claim 3, wherein the second expansion device is disposed at the outlet side of the evaporator.

5. Apparatus according to claim 1, further including a non-return valve disposed between the outlet of said first heat exchanger and the upstream end of the first bypass branch.

6. Apparatus according to claim 1, further comprising
    a first circuit section and
    a second circuit section, said first circuit section and said second circuit section common to the air conditioning loop and the heating loop, said first circuit section connected between the downstream end of the first bypass branch and the first expansion device, said second circuit section connected between the evaporator and the compressor, and
    an internal heat exchanger comprising portions of said first circuit section and said second circuit section in heat transfer relationship.

7. Apparatus according to claim 6, wherein the first expansion device is arranged for expanding fluid in the air conditioning loop, the apparatus further including a second expansion device in the heating loop for expanding said fluid in the heating loop, the second expansion device disposed between the downstream end of the first bypass branch and said first circuit section.

8. Apparatus according to claim 1, wherein the first expansion device is arranged for expanding fluid in the air conditioning loop, the apparatus further including a second expansion device in the heating loop for expanding fluid in the heating loop, the second bypass branch being disposed in parallel with the first expansion device, the second expansion device being arranged in the second bypass branch upstream of the second heat exchanger.

9. Apparatus according to claim 8, wherein said fluid flow switching means comprise the first expansion device and the second expansion device, for preventing flow of said fluid such as to establish the heating loop and air conditioning loop respectively.

10. Apparatus according to claim 1, further including means for producing a stream of air for delivery into said space, said stream of air constituting said second external medium, and means defining a path for said stream of air.

11. Apparatus according to claim 1, further including means for producing a stream of air for delivery into said space, said stream of air constituting said second external medium, and means defining a path for said stream of air, wherein the evaporator and said second heat exchanger are disposed in series in said stream of air in the path, the evaporator upstream of the second heat exchanger in the path.

12. Apparatus according to claim 10, further including a heat source outside said fluid flow circuit, said heat source disposed in the path of said stream of air downstream of at least the evaporator.

13. Apparatus according to claim 1, further including means for varying thermal power transmitted from the heating loop to said second external medium.

14. Apparatus according to claim 13, further including a second expansion device, wherein the means for varying comprise means associated with at least one of the first expansion device and the second expansion device for adjusting the expansion devices.

15. Apparatus according to claim 13, wherein the means for varying comprise means associated with the compressor for varying a parameter selected from the group consisting of the capacity of the compressor and the speed of the compressor.

16. Apparatus according to claim 1, further including a reservoir disposed in the air conditioning loop upstream of the compressor.

17. An engine for a vehicle including the device of claim 1.

18. An apparatus for treating the atmosphere of an enclosed space in a vehicle, the apparatus enabling the flow of a fluid in an upstream to a downstream direction within a fluid flow circuit, the apparatus comprising:

a compressor for receiving said fluid in a gaseous state and compressing said fluid to a supercritical pressure;

a first heat exchanger downstream of said compressor, said first heat exchanger receiving said fluid that has been compressed and cooling said fluid at a substantially constant pressure through heat transfer with a first external medium;

a first expansion device downstream of said first heat exchanger, said first expansion device receiving said fluid from said first heat exchanger and reducing said pressure in said fluid so as place at least a portion of said fluid in a liquid state;

an evaporator downstream of said first expansion device, said evaporator receiving said fluid in the liquid state from said first expansion device and placing said fluid into the gaseous state at a substantially constant pressure, the downstream of said evaporator connected to the upstream of said compressor to provide said fluid in the gaseous state to said compressor;

a first bypass branch connected in parallel with said first heat exchanger and between said compressor and said first expansion device;

a fluid flow switch downstream of said evaporator and upstream of said first heat exchanger and said first bypass branch, said fluid flow switch operative to selectively direct said fluid into said first heat exchanger to form a cooling loop, and into said first bypass branch to form a heating loop, said evaporator transferring heat from a second external medium to said fluid in said cooling loop to cool said atmosphere, said evaporator transferring heat from said fluid to said second medium in said heating loop to heat said atmosphere, a second bypass branch controlled by said fluid flow switch, said second bypass branch connected by operation of said switch into said heating loop upstream of said evaporator, and a second heat exchanger in said second bypass branch, for transferring heat from said fluid to said second external medium to heat said atmosphere.

19. The apparatus according to claim 18 wherein said first expansion device is connected within said fluid flow circuit so as to expand said fluid in said cooling loop and said heating loop.

20. The apparatus according to claim 18 wherein said first expansion device is connected within said fluid flow circuit so as to expand said fluid in said cooling loop, the apparatus further including a second expansion device connected within said fluid flow circuit so as to expand said fluid in said heating loop.

21. The apparatus according to claim 18 further including a second expansion device connected within said fluid flow circuit downstream of said evaporator.

22. The apparatus according to claim 15 further including a non-return valve disposed downstream of said first heat exchanger so as to prevent upstream flow of said fluid into said first heat exchanger.

23. The apparatus according to claim 18 wherein said first heat exchanger and said first bypass branch meet at a junction, the apparatus further including a first section and a second section, said first section and said second section common to said cooling loop and said heating loop, said first section connecting said junction and said first expansion device, said second section connecting said evaporator and said compressor, said first circuit section and said second circuit section at least partially in heat transfer relation to thereby forming an internal heat exchanger.

24. The apparatus according to claim 23 wherein said first expansion device is connected within said fluid flow circuit so as to expand said fluid in said cooling loop, the apparatus further including a second expansion device in said heating loop, said second expansion device disposed downstream said first bypass branch and upstream said first circuit section.

25. The apparatus according to claim 18 wherein said first expansion device is connected within said fluid flow circuit so as to expand said fluid in said cooling loop, the apparatus further including a second expansion device in said heating loop for expanding said fluid, said second expansion device connected in said second bypass branch upstream of said second heat exchanger, said second bypass branch being connected in parallel with said first expansion device.

26. The apparatus according to claim 18 further including an air stream generator for generating an air stream;

a path for delivery of said air stream into said enclosed space, wherein said air stream is said second external medium, wherein said evaporator and said second heat exchanger are disposed in series in said path, said air stream first striking said evaporator.

27. The apparatus according to claim 18 further including an air stream generator for generating an air stream;

a path for delivery of said air stream into said enclosed space, wherein said air stream is said second external medium.

28. The apparatus according to claim 27 further including a heat source external to said fluid flow circuit, said heat source being disposed in the path of said air stream downstream of at least said evaporator.

29. The apparatus according to claim 18 further including thermal power switch for varying thermal power transmitted from said heating loop to said second external medium.

30. The apparatus according to claim 29 further including a second expansion device, wherein said thermal power switch is associated with at least one of said first expansion device and said second expansion device.

31. The apparatus according to claim 29 wherein said thermal power switch is associated with said compressor and varies a parameter selected from the group consisting of compressor capacity and compressor speed.

32. The apparatus according to claim 18 further including a reservoir disposed in said cooling loop upstream said compressor.

33. An engine for a vehicle including the device of claim 18.

34. An apparatus for treating the atmosphere of an enclosed space in a vehicle, the apparatus enabling the flow of a fluid in an upstream to a downstream direction within a fluid flow circuit, the apparatus comprising:

- a compressor for receiving said fluid in a gaseous state and compressing said fluid to a supercritical pressure;
- a first heat exchanger downstream of said compressor, said first heat exchanger receiving said fluid that has been compressed and cooling said fluid at a substantially constant pressure through heat transfer with a first external medium;
- a first expansion device downstream of said first heat exchanger, said first expansion device receiving said fluid from said first heat exchanger and reducing said pressure in said fluid so as place at least a portion of said fluid in a liquid state;
- an evaporator downstream of said first expansion device, said evaporator receiving said fluid in the liquid state from said first expansion device and placing said fluid into the gaseous state at a substantially constant pressure, the downstream of said evaporator connected to the upstream of said compressor to provide said fluid in the gaseous state to said compressor;
- a first bypass branch connected in parallel with said first heat exchanger and between said compressor and said first expansion device, said first heat exchanger and said first bypass branch meeting at a junction;
- a fluid flow switch downstream of said evaporator and upstream of said first heat exchanger and said first bypass branch, said fluid flow switch operative to selectively direct said fluid into said first heat exchanger to form a cooling loop, and into said first bypass branch to form a heating loop, said evaporator transferring heat from a second external medium to said fluid in said cooling loop to cool said atmosphere, said evaporator transferring heat from said fluid to said second medium in said heating loop to heat said atmosphere;
- a first section and a second section, said first section and said second section common to said cooling loop and said heating loop, said first section connecting said junction and said first expansion device, said second section connecting said evaporator and said compressor, said first circuit section and said second circuit section at least partially in heat transfer relation to thereby forming an internal heat exchanger;
- a second bypass branch controlled by said fluid flow switch, said second bypass branch connected by operation of said switch into said heating loop upstream of said evaporator, said second bypass branch being connected in parallel with said first expansion device,
- a second heat exchanger connected in said second bypass branch, for transferring heat from said fluid to said second external medium to heat said atmosphere;
- a second expansion device connected in said second bypass branch upstream of said second heat exchanger;
- an air stream generator for generating an air stream;
- a path for delivery of said air stream into said enclosed space, wherein said air stream is said second external medium, wherein said evaporator and said second heat exchanger are disposed in series in said path, said air stream first striking said evaporator.

* * * * *